(12) United States Patent
Murai et al.

(10) Patent No.: US 11,383,337 B2
(45) Date of Patent: Jul. 12, 2022

(54) WORKPIECE SUPPORT SYSTEM AND WORKPIECE SUPPORT METHOD

(71) Applicants: MITSUBISHI HEAVY INDUSTRIES, LTD., Tokyo (JP); Hokuto Corporation, Aichi (JP)

(72) Inventors: Tomohiro Murai, Tokyo (JP); Takuya Hirata, Aichi (JP)

(73) Assignees: MITSUBISHI HEAVY INDUSTRIES, LTD., Tokyo (JP); HOKUTO CORPORATION, Aichi (JP)

( * ) Notice: Subject to any disclaimer, the term of this patent is extended or adjusted under 35 U.S.C. 154(b) by 255 days.

(21) Appl. No.: 16/956,908

(22) PCT Filed: Jan. 4, 2019

(86) PCT No.: PCT/JP2019/000014
§ 371 (c)(1),
(2) Date: Jun. 22, 2020

(87) PCT Pub. No.: WO2019/135406
PCT Pub. Date: Jul. 11, 2019

(65) Prior Publication Data
US 2020/0391333 A1    Dec. 17, 2020

(30) Foreign Application Priority Data

Jan. 5, 2018 (JP) .............................. JP2018-000682

(51) Int. Cl.
*B23Q 3/08* (2006.01)
*B25J 9/00* (2006.01)
(Continued)

(52) U.S. Cl.
CPC .............. *B23Q 3/08* (2013.01); *B25J 9/0096* (2013.01); *B25J 9/1669* (2013.01); *B64F 5/10* (2017.01)

(58) Field of Classification Search
CPC .... B23Q 3/08; B23Q 2230/002; B23Q 1/035; B25J 9/0096; B25J 9/1669; B25J 13/00; B64F 5/10
(Continued)

(56) References Cited

U.S. PATENT DOCUMENTS 5,081,889 A * 1/1992 Takano ................. B23Q 7/048
82/122
5,094,426 A * 3/1992 Zajac .................. F16K 31/1221
251/129.05
(Continued)

FOREIGN PATENT DOCUMENTS

CN    106141734 A    11/2016
JP    2003-001535 A   1/2003
(Continued)

OTHER PUBLICATIONS

International Search Report in corresponding International Application No. PCT/JP2019/000014, dated Apr. 9, 2019 (5 pages).
(Continued)

*Primary Examiner* — B M M Hannan
(74) *Attorney, Agent, or Firm* — Osha Bergman Watanbe & Burton LLP

(57) ABSTRACT

A workpiece support system includes: a plurality of rods that are extendable and retractable in an axial direction; a holder rotatably placed in an upper end portion of each of the rods, to hold a workpiece; a first lock part that keeps an extended/retracted position of the rod in the axial direction; and a position adjustment device including a hand portion configured to hold the rod or the holder, to perform position control of the hand portion. The position adjustment device moves the hand portion, to extend and retract the rod, based on shape data of the workpiece that is recorded in advance, in a state where the rod or the holder is held by the hand portion, and the first lock part keeps the extended/retracted
(Continued)

position of the rod extended and retracted by the position adjustment device.

5 Claims, 8 Drawing Sheets

(51) Int. Cl.
*B25J 9/16* (2006.01)
*B64F 5/10* (2017.01)

(58) Field of Classification Search
USPC .......................................................... 269/45
See application file for complete search history.

(56) References Cited

U.S. PATENT DOCUMENTS

| | | | |
|---|---|---|---|
| 5,305,992 A | 4/1994 | Kish | |
| 5,485,988 A * | 1/1996 | Nobilec | A63C 11/26 |
| | | | 269/21 |
| 6,250,619 B1 | 6/2001 | Cook et al. | |
| 8,967,931 B1 * | 3/2015 | Brownlie | B60P 7/135 |
| | | | 410/121 |
| 2005/0220428 A1 * | 10/2005 | Bottcher | G02B 6/25 |
| | | | 385/123 |
| 2006/0042432 A1 * | 3/2006 | Bottcher | G02B 6/25 |
| | | | 83/13 |
| 2007/0020065 A1 | 1/2007 | Kirby | |
| 2012/0266422 A1 * | 10/2012 | Galota | F16B 5/0642 |
| | | | 24/569 |
| 2013/0190925 A1 * | 7/2013 | Miyoshi | B25J 15/00 |
| | | | 294/213 |
| 2016/0339551 A1 * | 11/2016 | Morihara | B23Q 3/086 |
| 2017/0100839 A1 | 4/2017 | Kai et al. | |
| 2020/0338772 A1 * | 10/2020 | Hernandez | B23Q 9/02 |

FOREIGN PATENT DOCUMENTS

| | | |
|---|---|---|
| JP | 2010-051980 A | 3/2010 |
| JP | 2012-125862 A | 7/2012 |
| JP | 5766485 B2 | 8/2015 |
| JP | 2017-127929 A | 7/2017 |
| WO | 2005-042204 A2 | 5/2005 |
| ZA | 2006-02407 B | 5/2007 |

OTHER PUBLICATIONS

Written Opinion in corresponding International Application No. PCT/JP2019/000014, dated Apr. 9, 2019 (11 pages).
The Extended European Search Report issued in corresponding European Application No. 19736152.0, dated Dec. 18, 2020 (7 pages).

* cited by examiner

WORKPIECE SUPPORT SYSTEM AND WORKPIECE SUPPORT METHOD

TECHNICAL FIELD

The present invention relates to a workpiece support system and a workpiece support method.

BACKGROUND ART

During preparation of an aircraft part such as a tail in an aircraft, there is a case where a workpiece support device (hereinafter referred to as "the support device") is used to support a curved surface side of a workpiece from below so that a member having a curved surface (e.g., a plate-shaped member) is processed. The workpiece supported by the support device is cut and processed or the like from a side of an upper surface of the workpiece with a tool or the like grasped, for example, with an arm of a processing robot.

There is a type of support device provided with a plurality of extendable/retractable rods in a vertical direction, to hold the workpiece by a vacuum pad placed in an upper end portion of each of the rods. Furthermore, PTL 1 indicated below discloses a technology of suctioning and holding a plate-shaped workpiece with a plurality of suction tubes, and then immersing each of the suction tubes into an in/out hole, to draw the plate-shaped workpiece to a curved suctioning and holding surface formed in an upper surface of a jig body. Consequently, the plate-shaped workpiece is vacuum-suctioned with the suctioning and holding surface of the jog body, to prevent resonance of a cutting tool due to rotational vibration.

CITATION LIST

Patent Literature

[PTL 1] Publication of Japanese Patent No. 5766485

SUMMARY OF INVENTION

Technical Problem

A support device that supports a workpiece includes a plurality of extendable/retractable rods and vacuum pads each having an adjustable angle. In this case, an extended/retracted length of each of the rods is adjusted, and a placing direction of each of the vacuum pads is changed in accordance with a shape of the workpiece, so that a large number of types of workpieces having different curvatures can be supported with one support device.

In a preparation step before mounting the workpiece to the above described support device, it is necessary to adjust the extended/retracted length of each of the plurality of rods in accordance with a curved surface shape of the workpiece that is a support object. In this case, if an operator is to manually perform each adjustment operation, the operation takes time and labor because a large number of rods are present. Furthermore, there is concern that positional accuracy decreases. Furthermore, it can be considered that the extended/retracted length of each rod is automatically controlled, but in this case, it is necessary to place, for each rod, drive parts such as a servomotor, an amplifier and a linear scale as well as transmission mechanisms such as a guide and a ball screw, which results in a complicated and expensive configuration. Furthermore, cables each connecting the servomotor and the amplifier are required as many as the rods, and hence it is difficult to attach and remove a table that supports the rods. Additionally, a control panel becomes large scaled depending on a number of the rods.

The present invention has been developed in view of such situations, and an object thereof is to provide a workpiece support system and a workpiece support method capable of extending and retracting each rod with a simple configuration and holding the rod at a predetermined extended/retracted position.

Solution to Problem

A workpiece support system according to a first aspect of the present invention comprises a plurality of rods that are extendable and retractable in an axial direction, a holder rotatably placed in an upper end portion of each of the rods, to hold a workpiece, a first lock part that keeps an extended/retracted position of the rod in the axial direction, and a position adjustment device including a hand portion configured to hold the rod or the holder, to perform position control of the hand portion, wherein the position adjustment device moves the hand portion, to extend and retract the rod, based on shape data of the workpiece that is recorded in advance, in a state where the rod or the holder is held by the hand portion, and the first lock part keeps the extended/retracted position of the rod extended and retracted by the position adjustment device.

According to this configuration, the plurality of rods are extendable and retractable in the axial direction, and the holder rotatably placed in the upper end portion of the rod holds the workpiece. Furthermore, the first lock part keeps the extended/retracted position of the rod in the axial direction, and hence a large number of types of workpieces having different curvatures can be supported. Additionally, the position adjustment device moves the hand portion, to extend and retract the rod, based on the shape data of the workpiece that is recorded in advance, in the state where the rod or the holder is held by the hand portion of the position adjustment device. Then, the first lock part keeps the extended/retracted position of the rod extended and retracted by the position adjustment device. Consequently, without providing, for each rod, any drive devices or transmission mechanisms for transmitting a drive force, each of the rods can be extended and retracted with a simple configuration, and the rod can be held at a predetermined extended/retracted position in accordance with the shape data of the workpiece.

The above first aspect may further comprise a second lock part that keeps a rotating direction of the holder, wherein the position adjustment device may move the hand portion, to rotate the holder, based on the shape data of the workpiece that is recorded in advance, in a state where the holder is held by the hand portion, and the second lock part may keep the rotating direction of the holder rotated by the position adjustment device.

According to this configuration, the position adjustment device moves the hand portion, to rotate the holder, based on the shape data of the workpiece that is recorded in advance, in the state where the holder is held by the hand portion of the position adjustment device. Then, the second lock part keeps the rotating direction of the holder rotated by the position adjustment device. Consequently, the holder can be rotated with a simple configuration, and the holder can be held in a predetermined rotating direction in accordance with the shape data of the workpiece.

The above first aspect may further comprise a table part including an upper surface on which the plurality of rods are placed, and being rotatable about a rotary shaft parallel to a vertical direction.

According to this configuration, the table part including the upper surface on which the plurality of rods are placed is rotatable about the rotary shaft parallel to the vertical direction, and orientations of the plurality of rods and the workpiece supported by the plurality of rods can be changed relative to the position adjustment device.

In the above first aspect, the holder may include a suction part that vacuum-suctions the workpiece to be held.

According to this configuration, since the suction part vacuum-suctions the workpiece, the workpiece can be securely held.

A workpiece support method according to a second aspect of the present invention is a workpiece support method in which a workpiece support system is used, the workpiece support system comprising a plurality of rods that are extendable and retractable in an axial direction, a holder rotatably placed in an upper end portion of each of the rods, to hold a workpiece, a first lock part that keeps an extended/retracted position of the rod in the axial direction, and a position adjustment device including a hand portion configured to hold the rod or the holder, to perform position control of the hand portion, the workpiece support method comprising a step of moving the hand portion, to extend and retract the rod, based on shape data of the workpiece that is recorded in advance, in a state where the rod or the holder is held by the hand portion of the position adjustment device, and a step of keeping, by the first lock part, the extended/retracted position of the rod extended and retracted by the position adjustment device.

Advantageous Effects of Invention

According to the present invention, each of rods can be extended and retracted with a simple configuration, and the rod can be held at a predetermined extended/retracted position.

DESCRIPTION OF EMBODIMENTS

Figure 1:
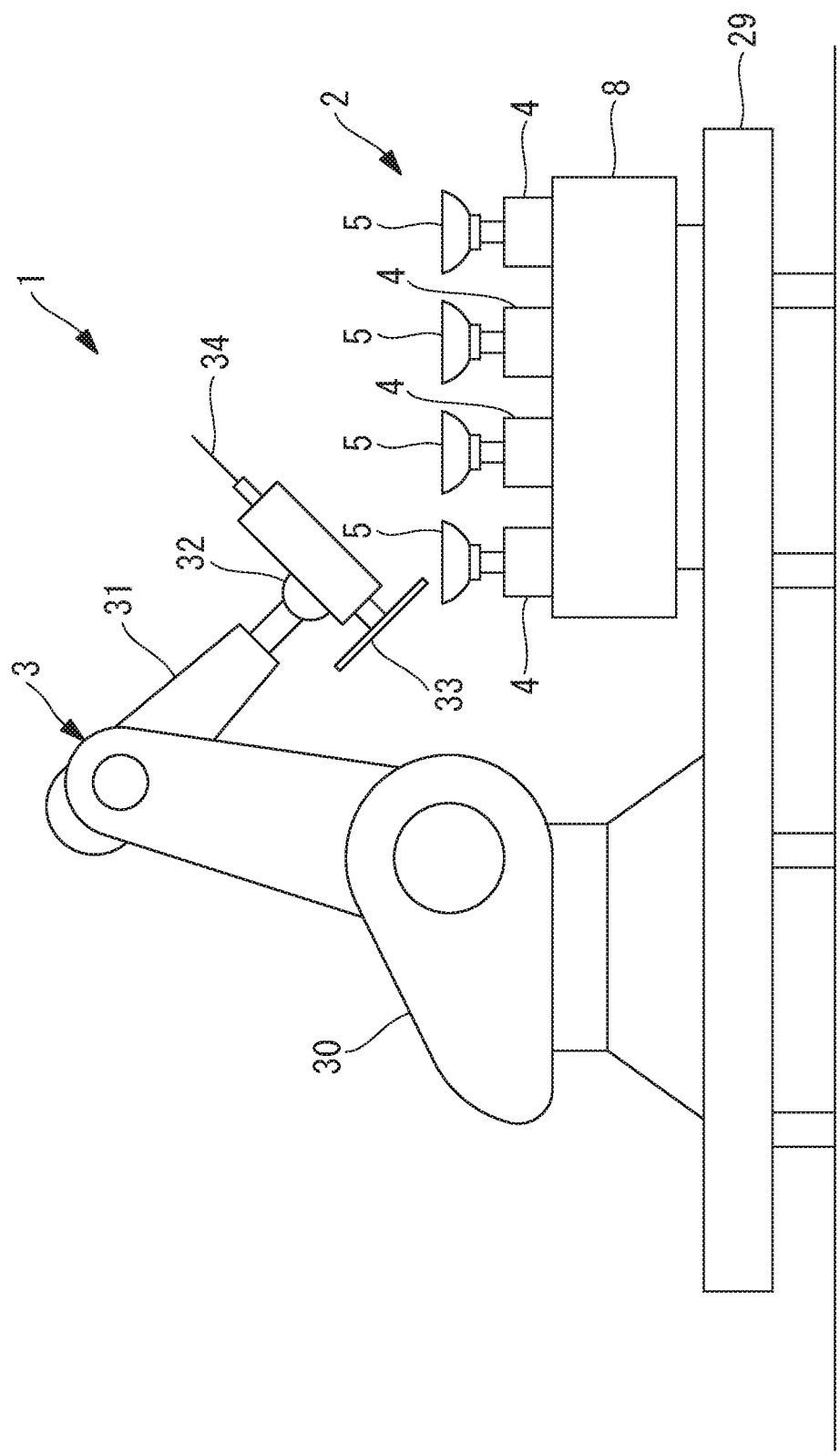
FIG. 1 is an entire configuration view showing a workpiece support/processing system according to an embodiment of the present invention.

A workpiece support/processing system 1 according to an embodiment of the present invention comprises, for example, a workpiece support device 2 (hereinafter referred to as "the support device") that supports a workpiece from below, and a robot 3 capable of processing the workpiece supported by the support device 2. In the present embodiment, the robot 3 not only processes the workpiece but also changes an extended/retracted position of each of rods 4 or changes a rotating direction of each of vacuum pads (a suction part) 5 in the support device 2 in a preparation step as described later. The workpiece support/processing system 1 is an example of a workpiece support system of the present invention.

The workpiece is, for example, a plate-shaped member, and the support device 2 according to the present embodiment can support the workpiece having a curved surface from a side of the curved surface of the workpiece. The workpiece is variously processed finally into a part of any type of product. The part to be prepared is, for example, a skin having the curved surface, such as an aircraft part of a tail or the like in an aircraft. Note that the workpiece is not limited to the plate-shaped member, and may be a member having another shape.

In the support device 2, a plurality of rods 4 that are extendable and retractable are provided in a vertical direction, and the workpiece is held by the vacuum pads 5 each having an adjustable angle and each placed in an upper end portion of the rod 4. In the support device 2, an extended/retracted length of the rod 4 is adjusted, or a placing direction of the vacuum pad 5 is changed, so that a large number of types of workpieces having different curvatures can be supported with one support device 2.

The support device 2 includes the plurality of rods 4, the vacuum pads 5, an extension/retraction lock mechanism (a first lock part) 6, a rotation lock mechanism (a second lock part) 7, a rotary table (a table part) 8 and others.

Each of the rods 4 is a cylindrical member placed on an upper surface of the rotary table 8, and being extendable and retractable in an axial direction. The plurality of rods 4 are arranged, for example, at equal intervals in a rectangular region. The rod 4 has an extendable and retractable configuration in which a plurality of cylindrical members having different diameters are combined in a nested manner.

Figure 2:
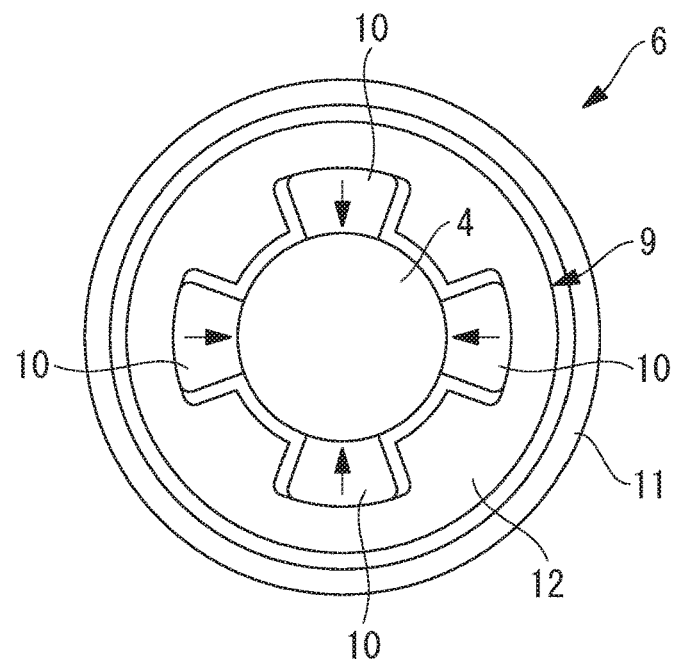
FIG. 2 is a transverse cross-sectional view showing an extension/retraction lock mechanism of a workpiece support device according to the embodiment of the present invention.
Figure 3:
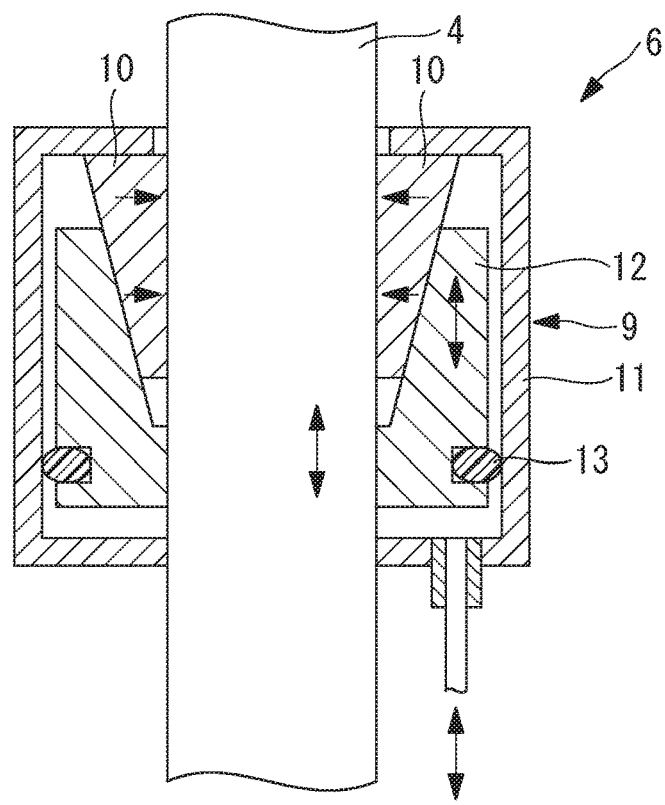
FIG. 3 is a longitudinal cross-sectional view showing the extension/retraction lock mechanism of the workpiece support device according to the embodiment of the present invention.

The rod 4 is provided with the extension/retraction lock mechanism 6, and the extension/retraction lock mechanism 6 keeps an extended/retracted position of the rod 4 in the axial direction. The extension/retraction lock mechanism 6 may only include a configuration capable of fixing the extended/retracted position of the member that is extendable and retractable in the axial direction, that is, an extended/retracted length, and includes a usually used technology applicable thereto. As shown in FIG. 2 and FIG. 3, the extension/retraction lock mechanism 6 fixes the position of the rod 4, for example, by means of a piston mechanism 9 and wedge members 10.

The piston mechanism 9 includes a cylinder 11, a piston 12 and others. In the cylinder 11, the piston 12 and the wedge members 10 are received. The cylinder 11 is provided along the axial direction of the rod 4 to surround the rod 4 in a circumferential direction. The piston 12 is movable along the axial direction of the rod 4 in the cylinder 11. The piston 12 is moved, for example, by an air pressure, a hydraulic pressure, or an electromagnetic force. In an example shown in FIG. 3, the piston 12 is moved upward by supplying air or oil or applying the electromagnetic force to a lower space of the cylinder 11 that is closed with a piston ring 13 and the cylinder 11. Furthermore, the piston 12 is moved downward by discharging the air or oil or releasing the applied electromagnetic force from the lower space.

The wedge members 10 are arranged between an outer peripheral surface of the rod 4 and an inner peripheral surface of the piston 12. A plurality of wedge members 10 may be arranged in the circumferential direction of the rod 4. In an example shown in FIG. 2, four wedge members 10 are arranged at the equal intervals in the circumferential direction of the rod 4. Each of the wedge members 10 is placed so that one end side having a smaller thickness is located below and the other end side having a larger thickness is located above, and in the inner peripheral surface of the piston 12, grooves are formed in accordance with inclined shapes of the wedge members 10.

In the extension/retraction lock mechanism 6, when the piston 12 is located below, the other end side of each wedge member 10 is free from a ceiling surface of the cylinder 11, and hence the rod 4 is not bound by the wedge members 10 so that the rod 4 is movable along the axial direction. Conversely, when the piston 12 is located above, the one end side of each wedge member 10 is pushed by the piston 12, and the other end side of the wedge member 10 abuts on the ceiling surface of the cylinder 11, thereby fixing the position of the member. At this time, each wedge member 10 is pressed toward a center of the rod 4 by the piston 12, and the rod 4 is hard to slide against the wedge member 10, so that the movement of the rod 4 in the axial direction is constrained. Consequently, the extension/retraction lock mechanism 6 keeps the extended/retracted position of the rod 4.

Each of the vacuum pads 5 is rotatably placed in the upper end portion of the rod 4. The vacuum pad 5 includes a sucker-shaped vacuum cup 14, a negative pressure hose 15, a spherical bearing 16 and others. The negative pressure hose 15 is connected to a vacuum pump (not shown), and during drive of the vacuum pump, a negative pressure is applied to a space between the hose and the workpiece mounted on the vacuum cup 14. The spherical bearing 16 is connected to the vacuum cup 14, to rotatably hold the vacuum cup 14.

The vacuum pad 5 is provided with the rotation lock mechanism 7, and the rotation lock mechanism 7 keeps the rotating direction of the vacuum pad 5. The rotation lock mechanism 7 may only include a configuration capable of fixing a rotating direction of a rotatable member, and includes a usually used technology applicable thereto. In the rotation lock mechanism 7, as shown in each of FIG. 4 to FIG. 6, the rotating direction of the spherical bearing 16 is fixed, for example, by a piston mechanism 18.

Figure 4:
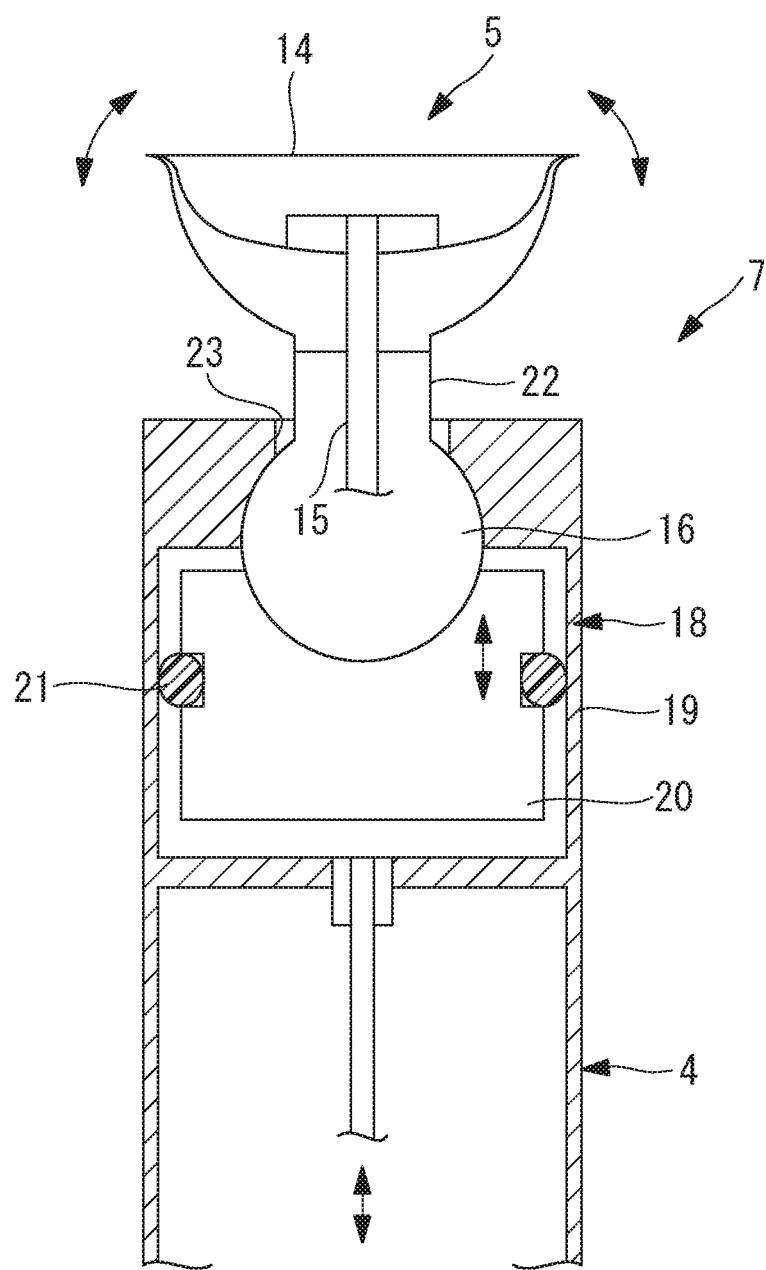
FIG. 4 is a longitudinal cross-sectional view showing a first example of a rotation lock mechanism of the workpiece support device according to the embodiment of the present invention.
Figure 5:
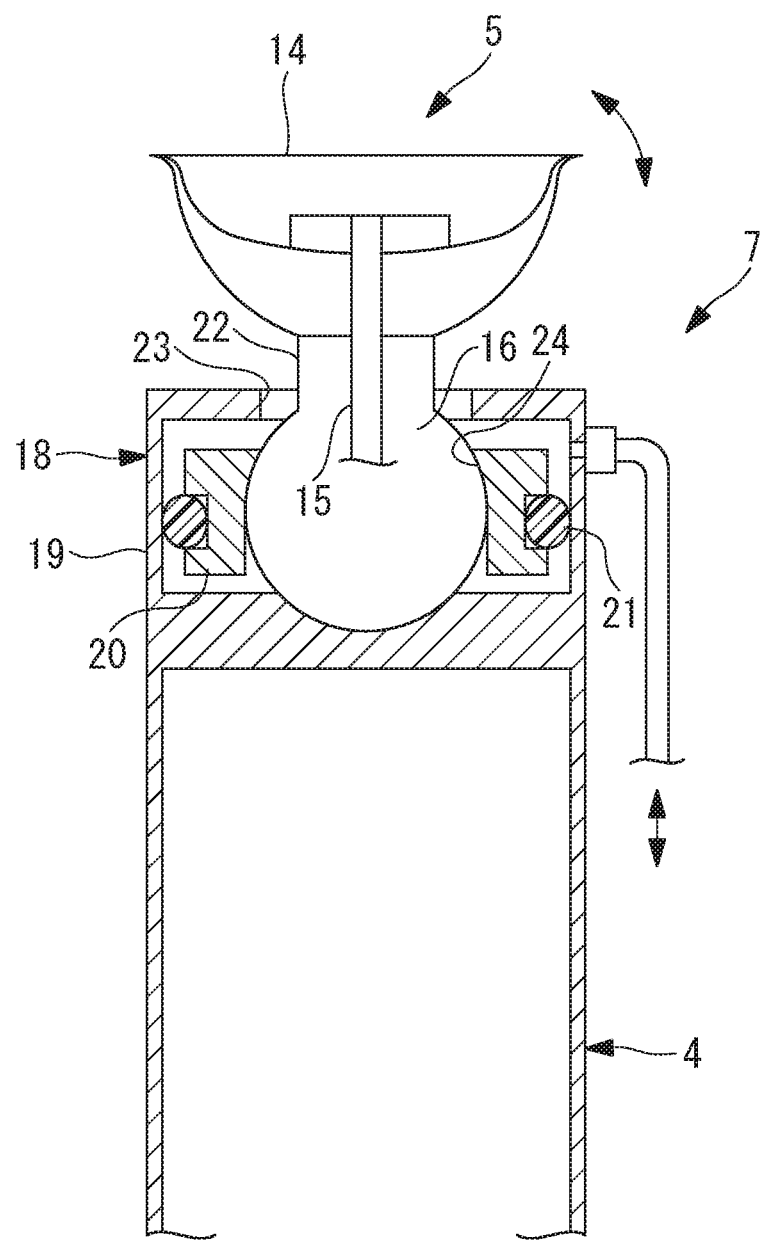
FIG. 5 is a longitudinal cross-sectional view showing a second example of the rotation lock mechanism of the workpiece support device according to the embodiment of the present invention.

In examples shown in FIG. 4 and FIG. 5, the piston mechanism 18 includes a cylinder 19, a piston 20 received in the cylinder 19, and others. The cylinder 19 is provided at a tip of the rod 4, and the piston 20 is movable along the axial direction of the rod 4 in the cylinder 19. The piston 20 is moved, for example, by an air pressure, a hydraulic pressure or an electromagnetic force in the same manner as in the piston 12.

In the example shown in FIG. 4, the piston 20 is moved upward by supplying air or oil or applying the electromagnetic force to a lower space of the cylinder 19 that is closed with a piston ring 21 and the cylinder 19. Furthermore, the piston 20 is moved downward by discharging the air or oil or releasing the applied electromagnetic force from the lower space.

The spherical bearing 16 connected to the vacuum cup 14 is disposed at a position that can be sandwiched between an upper surface of the piston 20 and an upper surface of the cylinder 19. In the upper surface of the cylinder 19, an opening 23 is formed through which a connecting portion 22 between the vacuum cup 14 and the spherical bearing 16 can extend.

In the rotation lock mechanism 7, when the piston 20 is located below, the spherical bearing 16 is free from the upper surface of the cylinder 19. Consequently, the spherical bearing 16 is not bound by the piston 20 and the cylinder 19, and the vacuum cup 14 and the spherical bearing 16 are rotatable. Conversely, when the piston 20 is located above, the spherical bearing 16 is bound by the piston 20 and the cylinder 19. Consequently, the rotation lock mechanism 7 keeps the rotating direction of the vacuum pad 5.

On the other hand, in the example shown in FIG. 5, unlike the example shown in FIG. 4, the piston 20 is moved downward by supplying air or oil or applying an electromagnetic force to an upper space of the cylinder 19 that is closed with the piston ring 21 and the cylinder 19. Furthermore, the piston 20 is moved upward by discharging the air or oil or releasing the applied electromagnetic force from the upper space.

The spherical bearing 16 connected to the vacuum cup 14 is disposed at a position that can be sandwiched between a lower surface of the piston 20 and a lower surface of the cylinder 19. In the upper surface of the cylinder 19 and the piston 20, openings 23, 24 are formed through which a connecting portion 22 between the vacuum cup 14 and the spherical bearing 16 can extend.

In the rotation lock mechanism 7, when the piston 20 is located above, the spherical bearing 16 is free from the lower surface of the cylinder 19. Consequently, the spherical bearing 16 is not bound by the piston 20 and the cylinder 19, and the vacuum cup 14 and the spherical bearing 16 are rotatable. Conversely, when the piston 20 is located below, the spherical bearing 16 is bound by the piston 20 and the cylinder 19. Consequently, the rotation lock mechanism 7 keeps the rotating direction of the vacuum pad 5.

Figure 6:
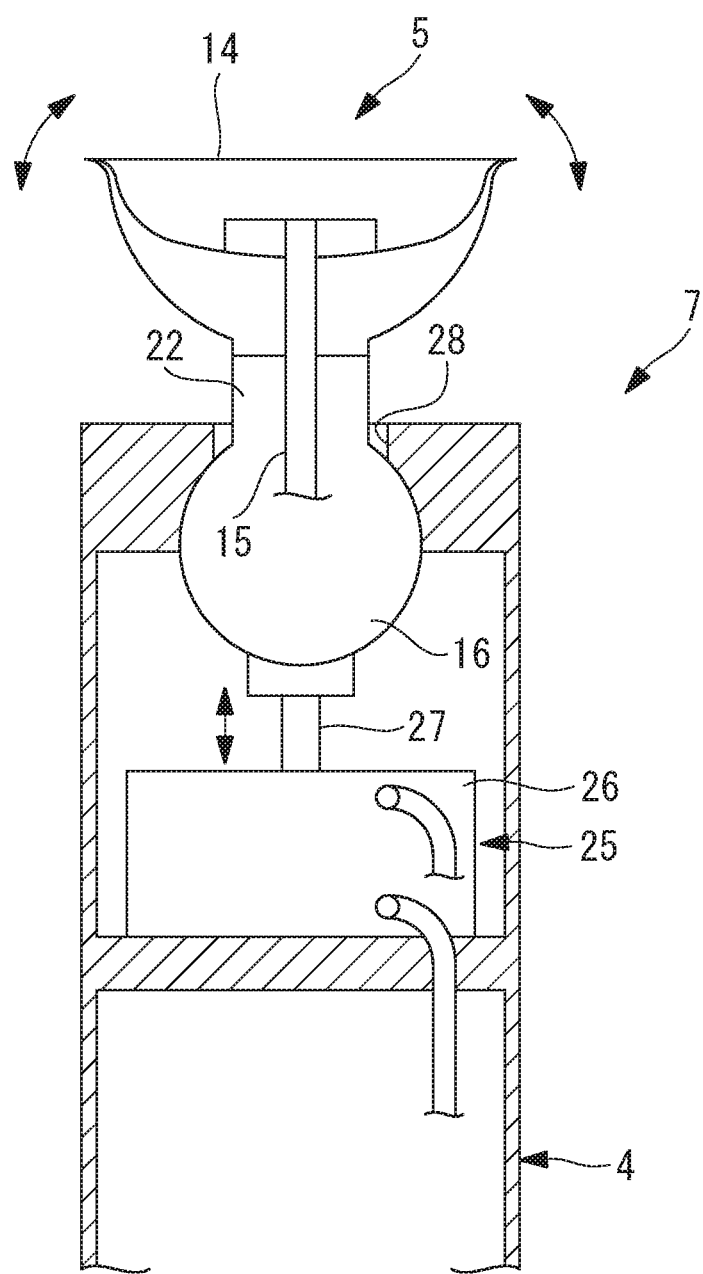
FIG. 6 is a longitudinal cross-sectional view showing a third example of the rotation lock mechanism of the workpiece support device according to the embodiment of the present invention.

Furthermore, in an example shown in FIG. 6, unlike the examples shown in FIG. 4 and FIG. 5, the cylinder 19 is not provided along extension from the rod 4, and a piston mechanism 25 is received in a space formed in an upper end portion of the rod 4. The piston mechanism 25 includes a cylinder 26, a piston (not shown) received in the cylinder 26, a piston rod 27 placed in the piston, and others. The piston is moved, for example, by an air pressure, a hydraulic pressure, or an electromagnetic force.

A spherical bearing 16 connected to a vacuum cup 14 is disposed at a position that can be sandwiched between an upper surface of the piston rod 27 and an upper surface of the rod 4. In the upper surface of the rod 4, an opening 28 is formed through which a connecting portion 22 between the vacuum cup 14 and the spherical bearing 16 can extend.

In the rotation lock mechanism 7, when the piston rod 27 is located below, the spherical bearing 16 is free from the upper surface of the rod 4, and hence the spherical bearing 16 is not bound by the piston rod 27 and the rod 4. Consequently, the vacuum cup 14 and the spherical bearing 16 are rotatable. Conversely, when the piston rod 27 is located above, the spherical bearing 16 is bound by the piston rod 27 and the rod 4. Consequently, the rotation lock mechanism 7 keeps a rotating direction of a vacuum pad 5.

The rotary table 8 includes the upper surface on which the plurality of rods 4 are placed, and is rotatable about a rotary shaft parallel to a vertical direction. The rotary table 8 is rotated, so that orientations of the plurality of rods 4 and the workpiece to be supported by the plurality of rods 4 can be changed relative to the robot 3. Consequently, each of the rods 4 and a region of the workpiece to be processed can be moved to a position at which an arm 31 and a hand 32 of the robot 3 are easily movable, and an operation by the robot 3 can be smoothly and accurately performed.

Note that as shown in FIG. 1, the support device 2 and the robot 3 may be put on a common base 29.

The robot 3 includes a main body 30, the arm 31, the hand 32 and others. The robot 3 is, for example, an industrial robot that can control six axes, and is an example of a position adjustment device. Note that the position adjustment device according to the present invention is not limited to the industrial robot that can control the six axes, and may be an industrial robot that can only control less than six axes, or an orthogonal axis machine tool including a spindle head.

As a control method of the robot 3, a usually used technology is applicable. Hereinafter, description will be made as to a configuration and an operation concerning a workpiece support method according to the present embodiment.

It is considered that the hand 32 of the robot 3 can hold the rod 4 or the vacuum pad 5. For example, the hand 32 may grasp the rod 4 or the vacuum pad 5 with a chuck mechanism to hold the rod 4 and the vacuum pad 5. Alternatively, the hand 32 is provided with a plate material 33, and the vacuum pad 5 suctions the plate material 33. Consequently, the hand 32 and the plate material 33 may hold the rod 4 and the vacuum pad 5.

Note that the hand 32 may be concurrently provided with not only a configuration (the chuck mechanism, the plate material 33 or the like) to hold the rod 4 or the vacuum pad 5 but also a tool 34 (a cutting tool, a boring tool or the like) to process the workpiece.

The robot 3 performs position control of the hand 32. The robot 3 moves the hand 32, to extend and retract the rod 4, based on shape data of the workpiece that is recorded in advance in a recording device such as a memory, in a state where the rod 4 or the vacuum pad 5 is held by the hand 32. That is, when the workpiece is supported by the support device 2, the rod 4 is extended and retracted by the hand 32 so that the vacuum pad 5 is located at a position corresponding to a lower surface of the workpiece. More specifically, the extended/retracted length of each rod 4 is adjusted based on a coordinate position of each region of the workpiece when the workpiece is supported by the vacuum pads 5.

The coordinate position of each region of the workpiece to be supported by the rods 4 is determined in accordance with a coordinate position of the rod 4. Furthermore, the extended/retracted length of the rod 4 in supporting the workpiece is determined based on the shape data of the workpiece. Note that an extending and retracting operation of the rod 4 by the hand 32 may be calculated and determined from design data concerning a shape of the workpiece, or may be determined in accordance with teaching before moving the arm 31 and the hand 32 to the workpiece actually supported by the rod 4.

The rod 4 extended and retracted by the robot 3 is held at the extended/retracted position by the extension/retraction lock mechanism 6. Consequently, the holding of the rod 4 by the hand 32 can be released, and an extended/retracted length of another rod 4 can be adjusted.

The robot 3 moves the hand 32, to rotate the vacuum pad 5 based on the shape data of the workpiece that is recorded in advance in the recording device, for example, the memory or the like in a state where the vacuum pad 5 is held by the hand 32. That is, when the workpiece is supported by the support device 2, the vacuum pad 5 is rotated by the hand 32 so that the rotating direction of the vacuum pad 5 matches an inclination direction of the lower surface of the workpiece. More specifically, the rotating direction of each vacuum pad 5 is adjusted based on an inclination direction of each region of the workpiece when the workpiece is supported by the vacuum pads 5.

When the vacuum pads 5 support the workpiece, an inclination direction of each vacuum pad is determined based on the shape data of the workpiece. Note that a rotating operation of each vacuum pad 5 by the hand 32 may be calculated and determined from the design data concerning the shape of the workpiece, or may be determined in accordance with teaching before moving the arm 31 and the hand 32 to the workpiece actually supported by the rods 4.

The vacuum pad 5 rotated by the robot 3 is held in the rotating direction by the rotation lock mechanism 7. Consequently, the holding of the vacuum pad 5 by the hand 32 can be released, and a rotating direction of another vacuum pad 5 can be adjusted by the hand 32.

Note that in case where the plate material 33 is placed on the hand 32 and the plate material 33 is suctioned by the vacuum pad 5, the adjustment of the extended/retracted length of the rod 4 and the adjustment of the rotating direction of the vacuum pad 5 can be substantially concurrently performed, and an operation time can be shortened as compared with a case where the adjustments are separately performed.

Next, description will be made as to an operation method of the workpiece support/processing system 1 according to the present embodiment with reference to FIG. 7A to FIG. 7F.

Figure 7A:
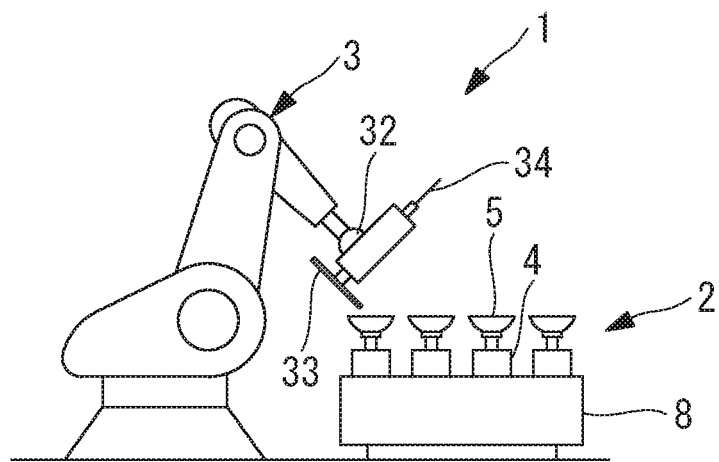
FIG. 7A is an explanatory view showing an operation of the workpiece support/processing system according to the embodiment of the present invention.
Figure 7B:
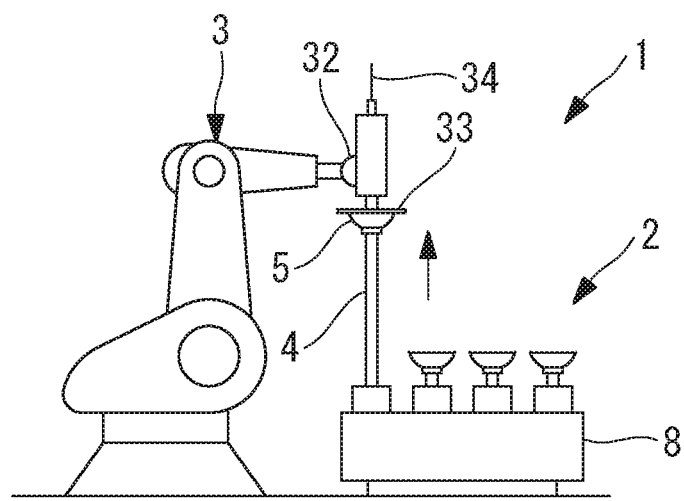
FIG. 7B is an explanatory view showing the operation of the workpiece support/processing system according to the embodiment of the present invention.

First, locking of all of the rods 4 and the vacuum pads 5 by the extension/retraction lock mechanism 6 and the rotation lock mechanism 7 is released (FIG. 7A). Then, as shown in FIG. 7B, the hand 32 of the robot 3 holds the vacuum pad 5, and the hand 32 is moved, to extend and retract the rod 4, based on the shape data of the workpiece. At this time, the rod 4 is extended and retracted by the hand 32 so that the vacuum pad 5 is located at the position corresponding to the lower surface of the workpiece. Afterward, the rod 4 extended and retracted by the robot 3 is held at the extended/retracted position by the extension/retraction lock mechanism 6.

Figure 7C:
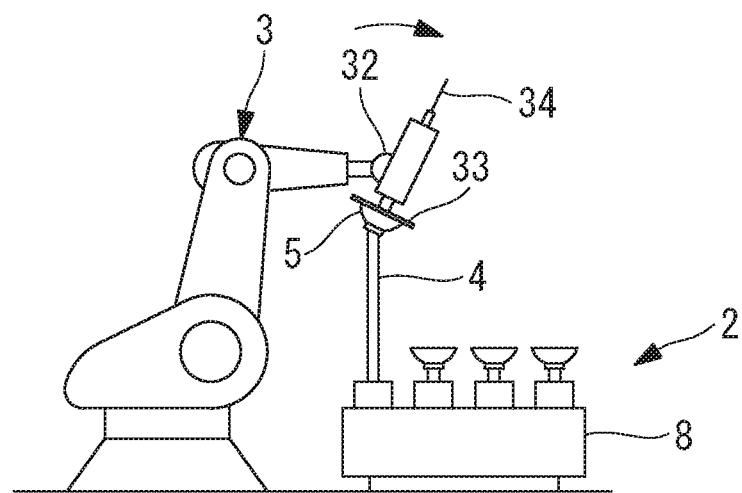
FIG. 7C is an explanatory view showing the operation of the workpiece support/processing system according to the embodiment of the present invention.

Furthermore, as shown in FIG. 7C, the hand 32 is moved, to rotate the vacuum pad 5, based on the shape data of the workpiece, in a state where the vacuum pad 5 is held by the hand 32 of the robot 3. At this time, the vacuum pad 5 is rotated by the hand 32 so that the rotating direction of the vacuum pad 5 matches the inclination direction of the lower surface of the workpiece. Afterward, the vacuum pad 5 rotated by the robot 3 is held in the rotating direction by the rotation lock mechanism 7.

Figure 7D:
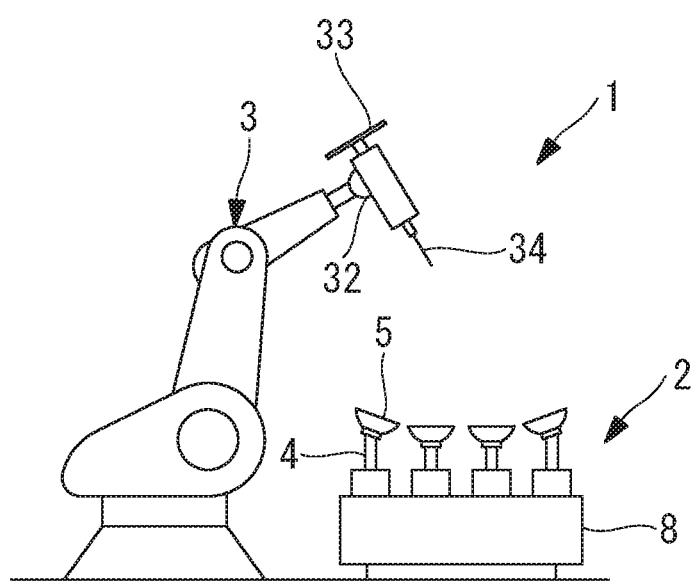
FIG. 7D is an explanatory view showing the operation of the workpiece support/processing system according to the embodiment of the present invention.
Figure 7E:
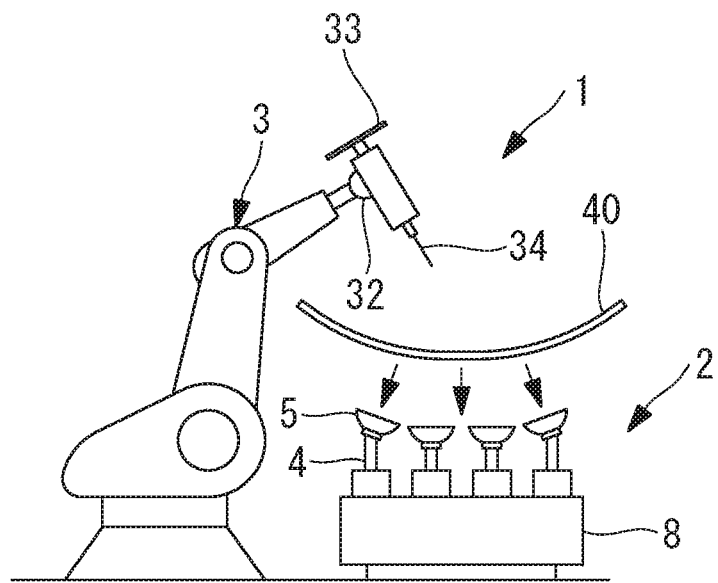
FIG. 7E is an explanatory view showing the operation of the workpiece support/processing system according to the embodiment of the present invention.
Figure 7F:
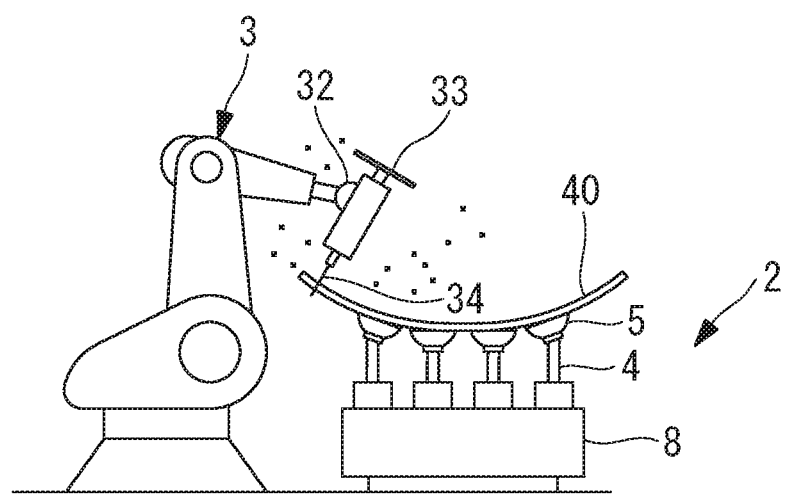
FIG. 7F is an explanatory view showing the operation of the workpiece support/processing system according to the embodiment of the present invention.

The operation described with reference to FIG. 7B and FIG. 7C is repeated for the respective rods 4 and vacuum pads 5, so that, as shown in FIG. 7D, the extended/retracted length of the rod 4 and the rotating direction of the vacuum pad 5 match the shape of the workpiece to be held. Then, the vacuum pump is operated so that the vacuum pad 5 is ready for vacuum suction of the workpiece, and as shown in FIG. 7E, a workpiece 40 is placed on the vacuum pads 5. Then, in a state where the workpiece 40 is fixed, as shown in FIG. 7F, the workpiece 40 is cut and processed or the like using the robot 3.

As above, according to the present embodiment, without placing, in each of the rods 4, a drive part such as a servomotor, an amplifier or a linear scale, or a transmission mechanism such as a guide or a ball screw, the extended/retracted length of the rod 4 and the rotating direction of each vacuum pad 5 in the support device 2 can be adjusted by the robot 3. Furthermore, in the preparation step, the robot 3 can not only change the extended/retracted position of each rod 4 or change the rotating direction of each vacuum pad 5 in the support device 2 but also process the workpiece supported by the support device 2.

Consequently, without providing each rod 4 with the drive device or the transmission mechanism for transmitting a drive force, the rod 4 can be extended and retracted and each vacuum pad 5 can be rotated with a simple configuration. Furthermore, in accordance with the shape data of the workpiece, the rod 4 can be held at a predetermined extended/retracted position, and the vacuum pad 5 can be held in a predetermined rotating direction.

The adjustment of the extended/retracted length of the rod 4 or the rotating direction of the vacuum pad 5 does not depend on the drive device or the transmission mechanism provided for exclusive use in each rod 4, and the robot 3 is used. Consequently, without using any special programs, the adjustment can be performed using a program of the robot 3. Furthermore, the operation of the robot 3 to adjust the extended/retracted length of the rod 4 or the rotating direction of the vacuum pad 5 is also simple, and hence an operator can perform the operation with the same feeling as in performing a conventional step of mounting the workpiece to the support device 2.

As described above, according to the present embodiment, the support device 2 has a simple configuration, and hence cost can be minimized. Furthermore, risk of failure can be reduced. Additionally, unlike a case where each rod is connected to the servomotor and the amplifier, any cables connecting the servomotor and the amplifier are not required. This facilitates an attaching, removing or rotating operation of the rotary table 8 that supports the rods 4.

Furthermore, the system comprises the rotation lock mechanism 7 that locks the rotating direction of the vacuum pad 5, and hence as compared with a case where the rotation lock mechanism 7 is not provided, the rotating direction of each vacuum pad 5 can be set to an accurate angle, and the respective vacuum pads 5 can firmly support the workpiece. In the case where the rotation lock mechanism 7 is not provided, the rotating direction of each vacuum pad 5 needs to follow the shape of the workpiece, which takes time and labor. Furthermore, the rotating direction of the vacuum pad 5 cannot be fixed perpendicularly to a surface of the workpiece. On the other hand, according to the present embodiment, the robot 3 adjusts the rotating direction of each vacuum pad 5, and the rotation lock mechanism 7 can keep the rotating direction. This can reduce time and labor required for the operation. Furthermore, in the present embodiment, the vacuum pad 5 can be set to the rotating direction based on the shape data, and hence the rotating direction of the vacuum pad 5 can be fixed perpendicularly to the surface of the workpiece. Consequently, even if the workpiece is deformed before mounted, the workpiece can be corrected to an accurate shape by performing the vacuum suction, and processing accuracy can be improved.

REFERENCE SIGNS LIST 1 workpiece support/processing system
2 workpiece support device (support device)
3 robot
4 rod
5 vacuum pad
6 extension/retraction lock mechanism
7 rotation lock mechanism
8 rotary table
9 piston mechanism
10 wedge member
11 cylinder
12 piston
13 piston ring
14 vacuum cup
15 negative pressure hose
16 spherical bearing
18 piston mechanism
19 cylinder
20 piston
21 piston ring
22 connecting portion
23 opening
24 opening
25 piston mechanism
26 cylinder
27 piston rod
28 opening
29 base
30 main body
31 arm
32 hand
33 plate material
34 tool

The invention claimed is:
1. A workpiece support system comprising:
a plurality of rods that are extendable and retractable in an axial direction,
a holder rotatably placed in an upper end portion of each of the rods, to hold a workpiece,
a first lock part that keeps an extended or a retracted position of the each of the rods in the axial direction, and
a position adjustment device including a hand portion configured to hold the each of the rods or the holder, to perform position control of the hand portion, wherein
the position adjustment device moves the hand portion, to extend and retract the each of the rods, based on shape data of the workpiece that is recorded in advance, in a state
where the each of the rods or the holder is held by the hand portion, and the first lock part keeps the extended or the retracted position of the each of the rods extended or retracted by the position adjustment device.

2. The workpiece support system according to claim 1, further comprising:

a second lock part that keeps a rotating direction of the holder, wherein the position adjustment device moves the hand portion, to rotate the holder, based on the shape data of the workpiece that is recorded in advance, in a state where the holder is held by the hand portion, and the second lock part keeps the rotating direction of the holder rotated by the position adjustment device.

3. The workpiece support system according to claim 1, further comprising:

a table part including an upper surface on which the plurality of rods are placed, and being rotatable about a rotary shaft parallel to a vertical direction.

4. The workpiece support system according to claim 1, wherein the holder includes a suction part that vacuum-suctions the workpiece to be held.

5. A workpiece support method in which a workpiece support system is used, the workpiece support system comprising:

a plurality of rods that are extendable and retractable in an axial direction, a holder rotatably placed in an upper end portion of each of the rods, to hold a workpiece, a first lock part that keeps an extended or a retracted position of the each of the rods in the axial direction, and a position adjustment device including a hand portion configured to hold the each of the rods or the holder, to perform position control of the hand portion, the workpiece support method comprising:

a step of moving the hand portion, to extend and retract the each of the rods, based on shape data of the workpiece that is recorded in advance, in a state where the each of the rods or the holder is held by the hand portion of the position adjustment device, and a step of keeping, by the first lock part, the extended or the retracted position of the each of the rods extended or retracted by the position adjustment device.

* * * * *